US011125254B2

(12) United States Patent
Erikksson et al.

(10) Patent No.: US 11,125,254 B2
(45) Date of Patent: Sep. 21, 2021

(54) ELECTRO-HYDRAULIC CONTROL SYSTEM WITH FAIL-SAFE PILOT VALVES

(71) Applicant: Parker Hannifin EMEA S.à.r.l., Etoy (CH)

(72) Inventors: Björn Erikksson, Johanneshov (SE); Hans Bodén, Borås (SE)

(73) Assignee: PARKER HANNIFIN EMEA S.À.R.L., Etoy (CH)

( * ) Notice: Subject to any disclaimer, the term of this patent is extended or adjusted under 35 U.S.C. 154(b) by 152 days.

(21) Appl. No.: 16/333,853

(22) PCT Filed: Oct. 18, 2016

(86) PCT No.: PCT/SE2016/051008
§ 371 (c)(1),
(2) Date: Mar. 15, 2019

(87) PCT Pub. No.: WO2018/074952
PCT Pub. Date: Apr. 26, 2018

(65) Prior Publication Data
US 2019/0257328 A1    Aug. 22, 2019

(51) Int. Cl.
*F15B 20/00* (2006.01)
*F15B 13/043* (2006.01)
(Continued)

(52) U.S. Cl.
CPC ............ *F15B 20/008* (2013.01); *B62D 5/003* (2013.01); *B62D 5/091* (2013.01); *B62D 5/30* (2013.01);
(Continued)

(58) Field of Classification Search
CPC . B62D 5/09; B62D 5/003; F15B 20/00; F15B 20/002; F15B 20/004; F15B 20/008;
(Continued)

(56) References Cited

U.S. PATENT DOCUMENTS 3,040,768 A * 6/1962 Pippenger ............... F15B 13/12
137/330
3,426,792 A * 2/1969 Wood .................... F15B 20/008
137/596.12
(Continued)

FOREIGN PATENT DOCUMENTS

WO    WO 2007059898    5/2007

OTHER PUBLICATIONS

International Search Report and Written Opinion of PCT/SE2016/0051008 dated Jun. 14, 2017.

*Primary Examiner* — Dustin T Nguyen
(74) *Attorney, Agent, or Firm* — Renner, Otto, Boisselle & Sklar, LLP (57) ABSTRACT

The disclosure relates to an electro-hydraulic control system for directing fluid to at least one hydraulic actuator, the system comprising at least one electronic controller; first and second pilot valves being electrically connected to the at least one electronic controller which is arranged to control the operation of the first and second pilot valves, third and fourth pilot valves being electrically connected to the at least one electronic controller which is arranged to control operation of the third and fourth pilot valves. A pilot operated main valve is configured to control fluid flow to at least one hydraulic actuator. Each of the first and second pilot valves and the third and fourth pilot valves is a fail-safe pilot valve (Continued)

arranged to drain a regulated outlet port to a low pressure reservoir if a spool of the fail-safe pilot valve becomes stuck in an open state.

20 Claims, 3 Drawing Sheets

(51) Int. Cl.
| | | |
|---|---|---|
| *F16K 31/06* | (2006.01) | |
| *B62D 5/09* | (2006.01) | |
| *B62D 5/30* | (2006.01) | |
| *F15B 11/10* | (2006.01) | |
| *B62D 5/00* | (2006.01) | |

(52) U.S. Cl.
CPC .......... *F15B 11/10* (2013.01); *F15B 13/0435* (2013.01); *F15B 20/002* (2013.01); *F15B 20/004* (2013.01); *F15B 13/043* (2013.01); *F15B 2211/20515* (2013.01); *F15B 2211/20538* (2013.01); *F15B 2211/20576* (2013.01); *F15B 2211/3052* (2013.01); *F15B 2211/355* (2013.01); *F15B 2211/634* (2013.01); *F15B 2211/6316* (2013.01); *F15B 2211/6346* (2013.01); *F15B 2211/6355* (2013.01); *F15B 2211/7054* (2013.01); *F15B 2211/8626* (2013.01); *F15B 2211/8633* (2013.01); *F15B 2211/8636* (2013.01); *F15B 2211/8752* (2013.01); *F15B 2211/8757* (2013.01); *F16K 31/0613* (2013.01)

(58) Field of Classification Search
CPC ............ F15B 2211/86; F15B 2211/862; F15B 2211/8626; F15B 2211/8623; F15B 2211/626; F15B 2211/8633; F15B 2211/8636; F15B 2211/865; F15B 2211/87; F15B 2211/875; F15B 2211/8752; F15B 2211/8757; F15B 13/0435; F16K 31/0613
See application file for complete search history.

(56) References Cited

U.S. PATENT DOCUMENTS

| | | | | |
|---|---|---|---|---|
| 4,245,671 A | * | 1/1981 | Kosugui | F15B 13/0431 |
| | | | | 137/625.6 |
| 5,186,204 A | * | 2/1993 | Oka | F16H 61/0251 |
| | | | | 137/238 |
| 5,249,603 A | * | 10/1993 | Byers, Jr. | H01F 7/1615 |
| | | | | 137/625.65 |
| 5,489,005 A | | 2/1996 | Marcott et al. | |
| 5,784,944 A | * | 7/1998 | Tozawa | E02F 3/437 |
| | | | | 91/361 |
| 6,283,149 B1 | * | 9/2001 | Hayashi | F15B 13/0402 |
| | | | | 137/554 |
| 6,631,320 B1 | | 10/2003 | Holt et al. | |
| 7,028,980 B2 | * | 4/2006 | Kokubu | F16K 31/0613 |
| | | | | 251/129.15 |
| 7,200,993 B2 | * | 4/2007 | Khalil | B62D 5/09 |
| | | | | 60/403 |
| 7,686,124 B2 | * | 3/2010 | Hublart | B62D 3/14 |
| | | | | 180/403 |
| 8,646,473 B2 | * | 2/2014 | Hall | F15B 20/008 |
| | | | | 137/14 |
| 9,163,745 B2 | * | 10/2015 | Murakami | F16K 31/06 |
| 9,248,854 B2 | * | 2/2016 | Belshan | B62D 5/30 |
| 9,371,843 B2 | * | 6/2016 | Moser | F15B 13/06 |
| 9,421,999 B2 | * | 8/2016 | Rotole | B62D 1/22 |
| 9,840,273 B2 | * | 12/2017 | Sullivan | B62D 5/0457 |
| 9,903,098 B2 | * | 2/2018 | Vigholm | F15B 13/0433 |
| 10,533,587 B2 | * | 1/2020 | Bargh | F15B 19/005 |
| 2004/0250536 A1 | | 12/2004 | Soerensen | |
| 2006/0218909 A1 | | 10/2006 | Khalil | |
| 2006/0219466 A1 | | 10/2006 | Khalil et al. | |
| 2014/0182277 A1 | * | 7/2014 | Kuipers | B62D 5/091 |
| | | | | 60/327 |
| 2014/0298798 A1 | | 10/2014 | Belshan et al. | |
| 2020/0309166 A1 | * | 10/2020 | Kawabuchi | F15B 21/08 |

* cited by examiner

ELECTRO-HYDRAULIC CONTROL SYSTEM WITH FAIL-SAFE PILOT VALVES

RELATED APPLICATION DATA

This application is a national stage application pursuant to 35 U.S.C. § 371 of PCT/SE2016/051008 filed on Oct. 18, 2016, the contents of which are incorporated herein by reference.

TECHNICAL FIELD

The disclosure relates to an electro-hydraulic control system for directing fluid to at least one actuator. The system comprises at least one electronic controller, first and second pilot valves being electrically connected to the at least one electronic controller which is arranged to control the operation of the first and second pilot valves and third and fourth pilot valves being electrically connected to the at least one electronic controller which is arranged to control operation of the third and fourth pilot valves. A pilot operated main valve is configured to control fluid flow to at least one hydraulic actuator. The first and second pilot valves and the third and fourth pilot valves are each being fluidly connected to the pilot operated main valve and configured to provide control action to the pilot operated main valve to control fluid flow to the at least one hydraulic actuator. The first pilot valve and the third pilot valve are connected in parallel via a first shuttle valve to the main valve. The second pilot valve and the fourth pilot valve are connected in parallel via a second shuttle valve to the main valve. The electro-hydraulic control system is particularly suitable for being used in a steering system for mobile machinery, such as mobile working machines. The disclosure also relates to a method for directing fluid to at least one hydraulic actuator in such an electro-hydraulic control system, use of such an electro-hydraulic control system, and a vehicle comprising such an electro-hydraulic control system.

BACKGROUND ART

Electro-hydraulic control systems for directing fluid to actuators in systems that require high level of reliability, such as steering actuators, are known in the art. Such systems commonly use a main valve configured to control fluid flow to actuators, and one pilot valve at each spool end of the main valve. One pilot at a time is actuated to regulate the pressure at the spool end. In case of malfunction of the pilot-controlled electro-hydraulic control system the actuators may quickly become uncontrollable. This may result in dangerous situations, in particular when the control system is used to steer a vehicle One solution for improving the reliability is known from US 2006/0218909 A1, which discloses an electro-hydraulic steering system comprising left and right primary steering valves and left and right redundant steering valves.

However, there are still room for improvements.

SUMMARY OF THE DISCLOSURE

The object of the present disclosure is to provide an improved electro-hydraulic control system for directing fluid to at least one actuator. This object is achieved by the features of the appended independent claims. Additional features of the disclosure are set out in the dependent claims.

The disclosure relates to an electro-hydraulic control system for directing fluid to at least one hydraulic actuator. The system comprises at least one electronic controller. First and second pilot valves are electrically connected to the at least one electronic controller which is arranged to control the operation of the first and second pilot valves. Third and fourth pilot valves are electrically connected to the at least one electronic controller which is arranged to control operation of the third and fourth pilot valves. A pilot operated main valve is configured to control fluid flow to at least one hydraulic actuator. The first and second pilot valves and the third and fourth pilot valves each are fluidly connected to the pilot operated main valve and configured to provide control action to the pilot operated main valve to control fluid flow to the at least one hydraulic actuator. The first pilot valve and the third pilot valve are connected in parallel via a first shuttle valve to a first pilot inlet port of the main valve. The second pilot valve and the fourth pilot valve are connected in parallel via a second shuttle valve to a second pilot inlet port of the main valve. Each of the first and second pilot valves and the third and fourth pilot valves is a fail-safe pilot valve arranged to drain a regulated outlet port of said pilot valve to a low pressure reservoir if a spool of the fail-safe pilot valve becomes stuck in an open state.

One advantage with this system is that if a spool of any one pilot valves gets stuck in an open position, that pilot valve will drain fluid supplied from a high-pressure fluid source to a low pressure reservoir, such as a container or tank, when a direction input is removed from the pilot valve. A direction input herein corresponds to electrical actuation of a solenoid of the pilot valve, such that an actuator of the solenoid moves and actuates the spool of the pilot valve towards an actuated position. A direction input to a pilot valve may for instance correspond to a left or right steering indication when the control system is used in a steering system. The automatic draining of the fail-safe pilot valve in case of spool becomes stuck in an actuated position removes the risk of that a faulty pilot valve conveys fluid from the high-pressure source to a pilot inlet port of a main valve although the solenoid of said pilot valve is not actuated. Without such an automatic draining the faulty pilot valve may effectively stall the spool of a main valve in an actuated position and thereby override a subsequent opposite direction input to the main valve, such that the main valve, and thus the entire control system, becomes uncontrollable The use of parallel connected first and third pilot valves and parallel connected second and fourth pilot valves respectively for controlling the main valve provides a backup pilot valve in case of one pilot valve failing. The shuttle valves ensures that in case one pilot valve controlling one pilot input side of the main valve fails and is drained, the parallel connected other pilot valve on that pilot input side of the main valve immediately can take over as the shuttle valve moves to close the output side of the failing pilot valve by the fluid pressure.

The system may further comprise a first pressure regulator connected to the first and second pilot valves and a second pressure regulator connected to the third and fourth pilot valves. The pressure provided from the first pressure regulator may be set higher than the pressure provided from the second pressure regulator. By providing the first and second pilot valves with a higher pressure than the pressure provided to the third and fourth pilot valves it is possible by monitoring the pressure level supplied to the pilot inlet ports of the main valve to determine whether any of the first and second pilot valves is malfunctioning. Thereby monitoring of each individual pilot valve is not necessary.

The system may comprise spool position monitoring of the main valve. By monitoring the spool position of the spool of the main valve, the difference in pressure provided by the first and second pilot valves and the third and fourth pilot valves respectively will push the spool of the main valve different distances within the main valve. Thereby it may be possible to detect whether the higher pressure level of the first and second pilot valves is supplied to the pilot inlet port of the main valve, or the lower pressure level of the third and fourth pilot valves is supplied to the pilot inlet port of the main valve. The main valve may for example be spring centred, meaning that the spool of the main valve has a spring on each longitudinal side thereof forcing the spool to move to a neutral position when no high-pressure fluid is supplied to the pilot input ports of the main valve. When high-pressure fluid is supplied to a pilot input port of the main valve the spool moves against the actuation force of the spring until a pressure equilibrium is attained between the pilot pressure urging the spool towards an actuated position and the spring pressure urging the spool towards the neutral position. The spool position monitoring may thus by monitoring the position of the spool of the main valve, and comparing this with the control input, determine the pilot pressure level, and thereby also determine if any of the first and second pilot valves is malfunctioning.

The system may comprise a first and second main valve pilot pressure sensors for monitoring the pilot pressure supplied to the first and second pilot inlet port respectively. In this example, the pilot pressure provided to the main valve is measured and when the pressure measured corresponds to the lower pressure provided by the third and fourth pilot valve, this is an indication that the first or the second pilot valve is malfunctioning. The side of the main valve on which the pressure sensor indicates a lower pressure indicates which one of the first and second pilot valves that has malfunctioned.

The system may comprise spool position monitoring of each of the first, second, third and fourth pilot valves respectively. When the spool position monitoring indicates a stuck spool of any one of the first, second, third and fourth pilot valves; direction inputs to the first, second, third or fourth pilot valve that has a stuck spool, is shut off. The position of the spool is constantly monitored and when a spool does not move in response to a direction input or return to a neutral position absent a direction input, a stuck spool is reported and the electronic controller stops sending direction inputs to the malfunctioning pilot valve. The spool monitoring system can be controlled by the at least one electronic controller or can be a separate monitoring controller being connected to the electronic controller.

The system may comprise a first, second, third and fourth pressure sensor monitoring the pilot valve pressure of each of the first, second, third and fourth pilot valves respectively. When a pressure sensor indicates a pressure error of any one of the first, second, third and fourth pilot valves, direction inputs to the first, second, third or fourth pilot valve that has a stuck spool, is shut off. A pressure error can for instance occur when the pressure of the fluid going out from a pilot valve to the main valve is higher than expected from a predetermined direction input. For instance, a first direction input will lead to that a first pilot valve opens and the pressure of the fluid going out from the first pilot valve increases to the working pressure of the fluid. When a second, opposite direction input does not lead to a decrease of the pressure of the fluid going out from the first pilot valve, a pressure error is reported. This corresponds to that the spool of the pilot valve is stuck in an open position.

With spool position monitoring the system can be setup to report a stuck spool of any one of the pilot valves. This means that there can be set conditions for how long the spool must be stuck in order for the electronic controllers to shut down the failing pilot valve. Conditions can also be set for how long the pressure fed to the main valve by the respective pilot valve can be at a certain level after a direction input has been removed. A too long time for either the spool to not move or for the pressure fed to the main valve to be higher than expected indicates an error in one of the pilot valves. The regulated port of the faulty pilot valve will drain to tank when a direction input to the pilot valve is removed.

The system may further comprise monitoring of other first, second, third and fourth pilot valve statuses. When any one of the first and third pilot valve or second and fourth pilot valve statuses indicates a failure of a pilot valve, the at least one electronic controller connected to the failed pilot valve disables the direction input to the failed pilot valve. The pilot valves can malfunction in other ways than the spool being stuck, for example by malfunctioned solenoid or fluid leakage. This information can be sent to the at least one electronic controller which then can decide to shut a malfunctioning pilot valve down.

The at least one electronic controller may be arranged to, in a normal operating mode, operate only the first pilot valve and the second pilot valve while the third pilot valve and the fourth pilot valve are idle, i.e. receiving no control signals. The third or fourth pilot valves are only activated when the at least one electronic controller enters a failure mode corresponding to a failure of either the first or second pilot valves. This ensures that there are always two pilot valves standing by to provide pilot pressure to the main valve, so that in case of the first pilot valve failing during operation the third pilot valve can be activated to provide a direction input to the main valve. This may result in less wear of the third and fourth pilot valves and reduced consumption of high-pressure fluid to the third and fourth pilot valves.

Alternatively, the at least one electronic controller may be arranged to operate the first pilot valve and the third pilot valve substantially in parallel and the second pilot valve and the fourth pilot valve substantially in parallel, both in normal operating mode and failure mode. This ensures that there are always two pilot valves ready to provide pressure to the main valve so that in case of the first pilot valve failing during operation the third pilot valve immediately takes over and continues to provide a direction input to the main valve. This may result in a more continuous operation of the electro-hydraulic control system in case of malfunction of a pilot valve.

The system may comprise a first pump arranged to provide fluid flow to the main valve and the first, second, third and fourth pilot valves.

The system may comprise an input device for providing direction input being electrically connected to the at least one electronic controller.

The system may comprise a first electronic controller and a second electronic controller to provide improved redundancy. The first and second electronic controllers may be electrically connected to each other to provide further improved redundancy, because thereby they can compare the direction inputs from the input device and control outputs from the first and/or second electronic controller so that they match. They can also compare statuses for a number of other vital system statuses. If one electronic controller fails, the other electronic controller can assume control until the failed electronic controller is replaced or repaired.

When using two electronic controllers, the first and second pilot valves may be electrically connected to the first electronic controller, which is arranged to relay the direction inputs from the input device to the first and second pilot valves. The third and fourth pilot valves may be electrically connected to the second controller, which is arranged to relay the direction inputs from the input device to the third and fourth pilot valves.

The input device for providing direction inputs may be electrically connected also to the second electronic controller. The connection of the input device to both electronic controllers increases redundancy of the system by that they can monitor each other's performance.

The input device may be a three signal input device. A three signal input device provides two separate and substantially identical direction inputs to the at least one controller, such that a signal input redundancy to the at least one controller is accomplished. The three signal input device can also ensure redundancy of the system when redundant direction inputs from a threes signal input device are forwarded to both the first and second electronic controller substantially simultaneously.

In order to provide redundancy for the fluid flow, the system may comprise more than one pump. The first pump may be a primary pump providing fluid flow to the system and the second pump may be a redundancy pump arranged to provide fluid flow to the system in case the primary pump fails. The second pump may be arranged to provide fluid flow to the main valve and the first, second, third and fourth pilot valves. The second pump may be arranged to be driven by an electrical motor, or by the rotation of one of more wheels of a vehicle on which the system is located. For example, the second pump may be a gear pump driven by the rotation of one of more of the vehicle's wheels may be used for ensuring temporary high-pressure fluid supply also in case of a sudden stop of a main power source of the vehicle. The first and second pump can run in parallel with both pumps providing hydraulic fluid to the system. Alternatively, the second pump is activated only when the first pump malfunctions.

The disclosure further concerns a vehicle comprising wheels for facilitating movement of the vehicle and an electro-hydraulic control system, wherein the at least one hydraulic actuator is connected to at least one wheel of the vehicle for steering the vehicle.

The system according to the above description may be used for many different purposes where a high level of redundancy is desired, such as for example steering a vehicle, controlling the control surfaces of an aircraft or for deploying or retracting the landing gear of an aircraft. Many other applications are possible.

The pilot operated main valve may also be referred to as a pilot operated directional control valve. The main valve may be hydraulically or pneumatically pilot operated.

The disclosure also relates to a method for directing fluid to at least one hydraulic actuator in an electro-hydraulic control system, the method comprising: providing at least one electronic controller; providing first and second fail-safe pilot valves being electrically connected to the at least one electronic controller which is arranged to control the operation of the first and second pilot valves; providing third and fourth fail-safe pilot valves being electrically connected to the at least one electronic controller which is arranged to control operation of the third and fourth pilot valves; providing a pilot operated main valve configured to control fluid flow to at least one hydraulic actuator; fluidly connecting each of the first and second pilot valves and each of the third and fourth pilot valves to the pilot operated main valve and configuring each if said pilot valves to provide control action to the pilot operated main valve to control fluid flow to the at least one hydraulic actuator; connecting the first pilot valve and the third pilot valve in parallel via a first shuttle valve to a first pilot inlet port of the main valve; connecting the second pilot valve and the fourth pilot valve in parallel via a second shuttle valve to a second pilot inlet port of the main valve; and if a spool of any of the fail-safe pilot valves becomes stuck in an open state, draining a regulated outlet port of said fail-safe pilot valve to a low pressure reservoir.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

In the figures high pressure hydraulic fluid connections are indicated by solid lines, pilot pressure hydraulic fluid connections are indicated by dashed lines and electrical connections are indicated by dash-dotted lines. It is to be understood that other equipment besides the ones shown in the figures can be part of the electro-hydraulic control system, both hydraulic and electrical. Examples are filters, flow restrictors, pressure regulators, distributor valves, batteries, fuses etc.

The electro-hydraulic steering control system 1 is hereinafter partly described in terms of a vehicle steering application but the electro-hydraulic steering control system 1 is not limited to this specific application and other applications where high level of redundancy is desired are equally possible.

Figure 1:
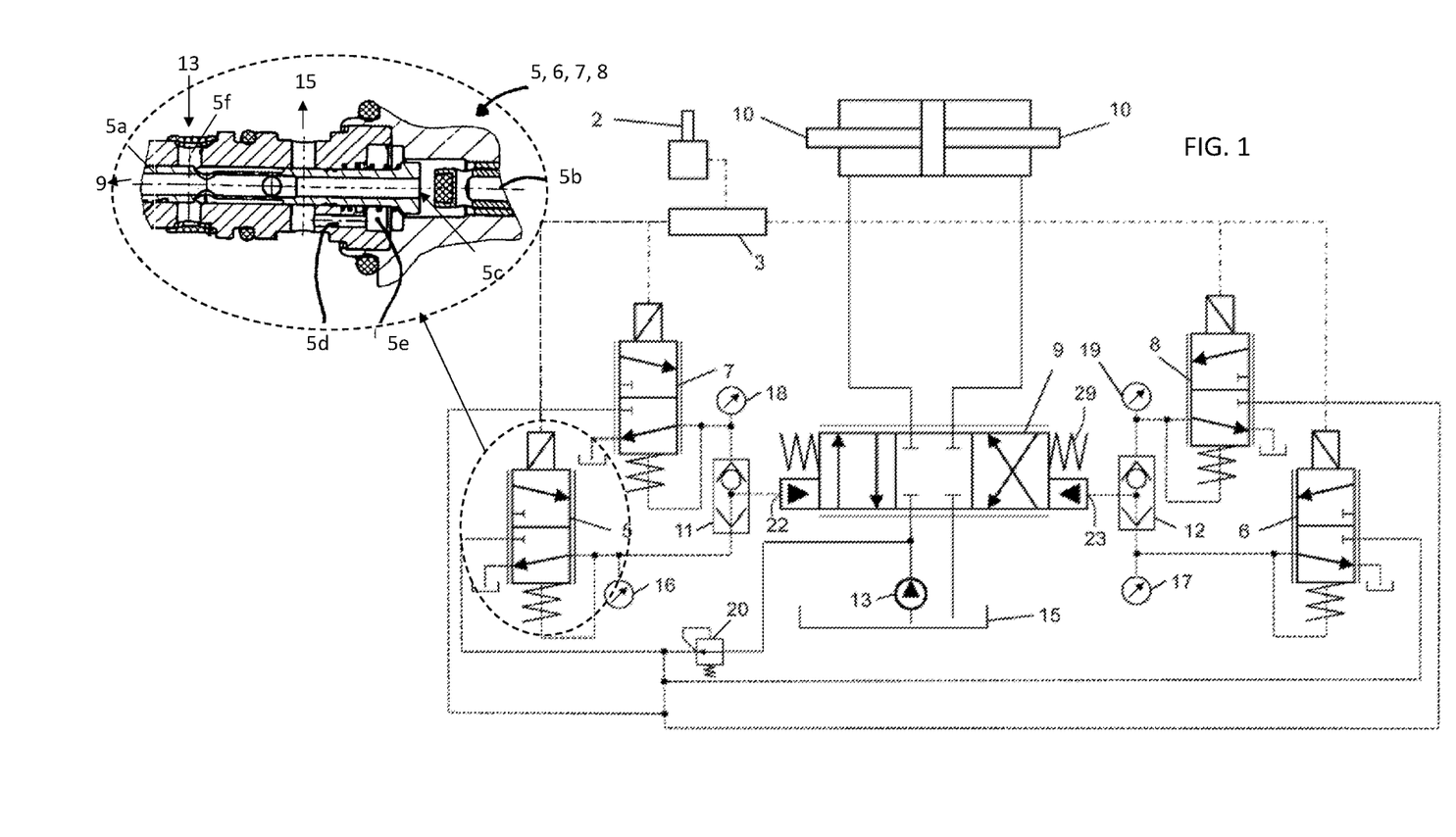
FIG. 1 schematically shows a layout of an electro-hydraulic control system according to a first example of the disclosure, FIG. 2 schematically shows a layout of an electro-hydraulic control system according to a second example of the disclosure, FIG. 3 schematically shows a layout of an electro-hydraulic control system for directing fluid to actuators according to a third example of the disclosure.

FIG. 1 schematically shows a layout of an electro-hydraulic control system 1 for directing fluid to an hydraulic actuator 10 according to a first example of the disclosure. The system 1 comprises an input device 2 for providing direction inputs. A direction input is in a first example a left or right indication by moving the input device 2 in the desired direction for steering a vehicle. A second example of a direction input is a left or right indication or up or down indication for control of a flight control surface such as rudder, aileron or elevator. A third example of a direction input is to deploy or retract a landing gear. The input device 2 can for instance be a joystick, a steering wheel, an electric or electro-mechanical switch.

In the example embodiment of FIG. 1, the input device 2 may be an output lever, joystick, control wheel, control button, or the like for enabling a driver to control the motion of the hydraulic actuator 10. The input device can for example give a left steering direction input and a right steering direction input. The input device 2 is electrically connected to a first electronic controller 3. A first pilot valve 5, a second pilot valve 6, a third pilot valve 7 and a fourth pilot valve 8 are electrically connected to the first electronic controller 3 relaying the direction inputs from the input device 2 to the first, second, third and fourth pilot valves 5, 6, 7, 8. Each pilot valve 5, 6, 7, 8 has an inlet port connected to a high-pressure fluid source, a first regulated outlet port connected to a pilot input port 22, 23 of the main valve 9, and a second outlet port connected to a low pressure reservoir, such as a tank. The first regulated outlet port and the second outlet port are fluidly connected when the pilot valve 5, 6, 7, 8 is in a deactivated state, and the inlet port and first regulated outlet port are fluidly connected when the pilot valve 5, 6, 7, 8 is in an activated state.

A pilot operated main valve 9 is configured to control fluid flow to the hydraulic actuator 10. The first and second pilot valves 5, 6 and the third and fourth pilot valves 7, 8 are each fluidly connected to the pilot operated main valve 9 and configured to provide a control action to the pilot operated main valve 9 to control fluid to the hydraulic actuator 10. The first pilot valve 5 and the third pilot valve 7 are connected to a first pilot inlet port 22 on the left side of the main valve 9 and may for example be arranged to provide a control action to the pilot operated main valve 9 upon a left steering direction input from the input device 2. The second pilot valve 6 and the fourth pilot valve 8 are connected to a second pilot inlet port 23 on the right side of the main valve 9 and may for example be arranged to provide a control action to the pilot operated main valve 10 upon a right steering direction input from the input device 2.

With control action is meant an action to operate the pilot operated main valve 9 such that it moves to either the left or the right position thereby controlling the flow of hydraulic fluid such that the hydraulic actuator 10 are moved left or right. The first pilot valve 5 and the third pilot valve 7 are connected in parallel through a first shuttle valve 11 to the pilot operated main valve 9. The first shuttle valve 11 is thus located between the first and third pilot valves 5, 7 and the main valve 9. The second pilot valve 6 and the fourth pilot valve 8 are connected in parallel through a second shuttle valve 12 to the pilot operated main valve 9. The second shuttle valve 12 is thus located between the second and fourth pilot valves 6, 8 and the main valve 9.

Each of the first and second pilot valves 5, 6 and the third and fourth pilot valves 7, 8 are fail-safe pilot valves arranged to drain the regulated outlet port to tank when a steering direction input from the input device is removed. With the regulated outlet port means the port of the pilot valve 5, 6, 7, 8 that is connected to the pilot input port of the main valve, and that is pressurized during a steering direction input thereby providing a control action to the pilot operated main valve 9.

A first pump 13 is arranged to provide fluid flow to the pilot operated main valve and to the first, second, third and fourth pilot valves 5, 6, 7, 8. The first pump 13 can be a fixed displacement pump or a variable displacement pump. The first pump 13 is connected to a tank 15. The first pump 13 is preferably the vehicle's main pump being able to supply all parts of the vehicle with hydraulic fluid flow.

The pilot operated main valve 9 may be spring centred. The pilot valves 5, 6, 7, 8 may be spring offset to a position where the hydraulic fluid from the first pump 13 is stopped by the spool of the pilot valve 5, 6, 7, 8 when the pilot valve is deactivated.

One example of how the fail-safe function of the pilot valves 5, 6, 7, 8 can function is to provide the spool of the pilot valves 5, 6, 7, 8 with a relief duct connected to the section of the pressure line which is led to the load, i.e. hydraulic actuators, and to the tank 15. The connection of the relief duct to the tank can be controlled by the pilot valve itself, meaning that the connection of the relief duct to the tank will be closed as long as there is a steering direction input to the specific pilot valve. One example of a fail-safe pilot valve can be found in WO 2007/059898 A1.

Many alternative designs may be used for providing a fail-safe pilot valve. According to one example embodiment shown in FIG. 1, the spool 5a of the first pilot valve 5 gets stuck in an open position shown in the detailed view of FIG. 1, i.e. a position so that a control action is provided to the pilot operated main valve 9 to steer for example to the left. Once the left steering direction input to the first pilot valve 5 has been removed, the actuator 5b of the integrated solenoid of the first pilot valve 5 returns to a nonactuated position. However, when the solenoid actuator 5b moves back to a non-actuated position and the spool 5a remains stuck in the actuated position, the solenoid actuator 5b becomes disconnected from spool 5a (at point 5c). This disconnection results in a fluid connection between an internal fluid line 5d, 5e of the spool and a surrounding cavity, thereby enabling fluid from the high-pressure source supplied to the inlet port 5f of the pilot valve to be drained to the tank 15. This means that even if the spool 5a in pilot valve 5 gets stuck in an open position, once the steering direction input is removed the high-pressure fluid supplied to the pilot valve is drained and the first pilot inlet port 22 of the main valve 9 is depressurized, thereby enabling the spool of the main valve 9 to return to its centre position by means of one 29 of its springs.

Once it is discovered that the spool of the first pilot valve 5 is stuck, further steering direction inputs to the first pilot valve 5 is shut off and the third pilot valve 7 takes over provides future steering actions to the main valve 9. The first shuttle valve 11 will shut the connection to the first pilot valve 5 once the third pilot valve 7 receives a left steering direction input. The vehicle can then be driven back for maintenance using the third pilot valve 7. An operator of the vehicle may also receive a warning that the vehicle is in a failure mode, or the like. The warning may for example be provided on the instrument cluster of the vehicle and/or by an alarm sound.

The system 1 further comprises a first pressure regulator 20 for supplying high-pressure fluid from the first pump 13 to the first, second, third and fourth pilot valves 5, 6; 7, 8 with a predetermined pressure level.

The system further comprises monitoring of the first, second, third and fourth pilot valves. When the monitoring of any one of the first, second, third or fourth pilot valves 5, 6, 7, 8 indicates a failure of a pilot valve 5, 6; 7, 8; the electronic controller 3 connected to the failed pilot valve 5, 6; 7, 8 disables the direction input to the failed pilot valve 5, 6; 7, 8. Monitoring can be done by means of spool position monitoring of each of the first, second, third and fourth pilot valves 5, 6; 7, 8 respectively, or by monitoring of the pilot valve pressure of each of the first, second, third and fourth pilot valves respectively by means of a first, second, third and fourth pressure sensor 16, 17, 18, 19.

When the spool position monitoring indicates a stuck spool of any one of the first, second, third and fourth pilot valves 5, 6; 7, 8, the regulated outlet port of the stuck pilot valve will drain to tank 15 when a direction input to the stuck pilot valve 5, 6; 7, 8 is removed.

When a pressure sensor 16, 17, 18, 19 indicates a pressure error of any one of the first, second, third and fourth pilot valves 5, 6; 7, 8, the regulated outlet port of the stuck pilot valve will drain to tank 15 when a direction input to the pilot valve 5, 6; 7, 8 is removed.

Alternatively, the main valve can be monitored by means of a spool position monitoring or main valve pressure sensors measuring the pressure on each side of the main valve 9. By using different pressures for the first and second pilot valve and the third and fourth pilot valve respectively, the output signal of a spool position sensor or pressure sensor can enable the first electronic controller 3 to determine which of the first or third and second or fourth pilot valve respectively that feeds the main valve.

The first and third pilot valves 5, 7 may define a first pair of pilot valves, and the second and fourth pilot valves 6, 8 may define a second pair of pilot valves. The first pair of pilot valves can be controlled by the first electric controller 3 substantially in parallel, meaning that all control signals from the first electronic controller is fed to both the first and third pilot valves 5, 7 in normal operating mode. If a pilot valve failure is detected the system enters failure mode and the control signals to that pilot valve is stopped. This approach provides smooth transition from the normal operating mode to the failure mode and does not rely on the detection of pilot valve failure for maintained functionality.

Alternatively, the first pair of pilot valves may be controlled sequentially, meaning that only the first pilot valve 5 is fed with control signals from the first electronic controller 3 in normal operating mode while keeping the third pilot valve 7 idle, and upon detection of failure of the first pilot valve feeding only the third pilot valve with control signals from the first electronic controller 3 and keeping the first pilot valve idle. This approach may be more energy-efficient but requires quick and reliable detection of pilot valve failure.

Also the second pair of pilot valves may be controlled in parallel or sequentially.

The system may be designed to operate in normal operating mode as long as no malfunction of the pilot valves is detected. The system may be designed to enter a failure mode after detection of failure of one of the pilot valves. These modes are applicable both when the third and fourth pilot valves 7, 8 are idle in normal operating mode, or when the third and fourth pilot valves 7,8 are activated substantially in parallel with the first and second pilot valves 5, 6.

Figure 2:
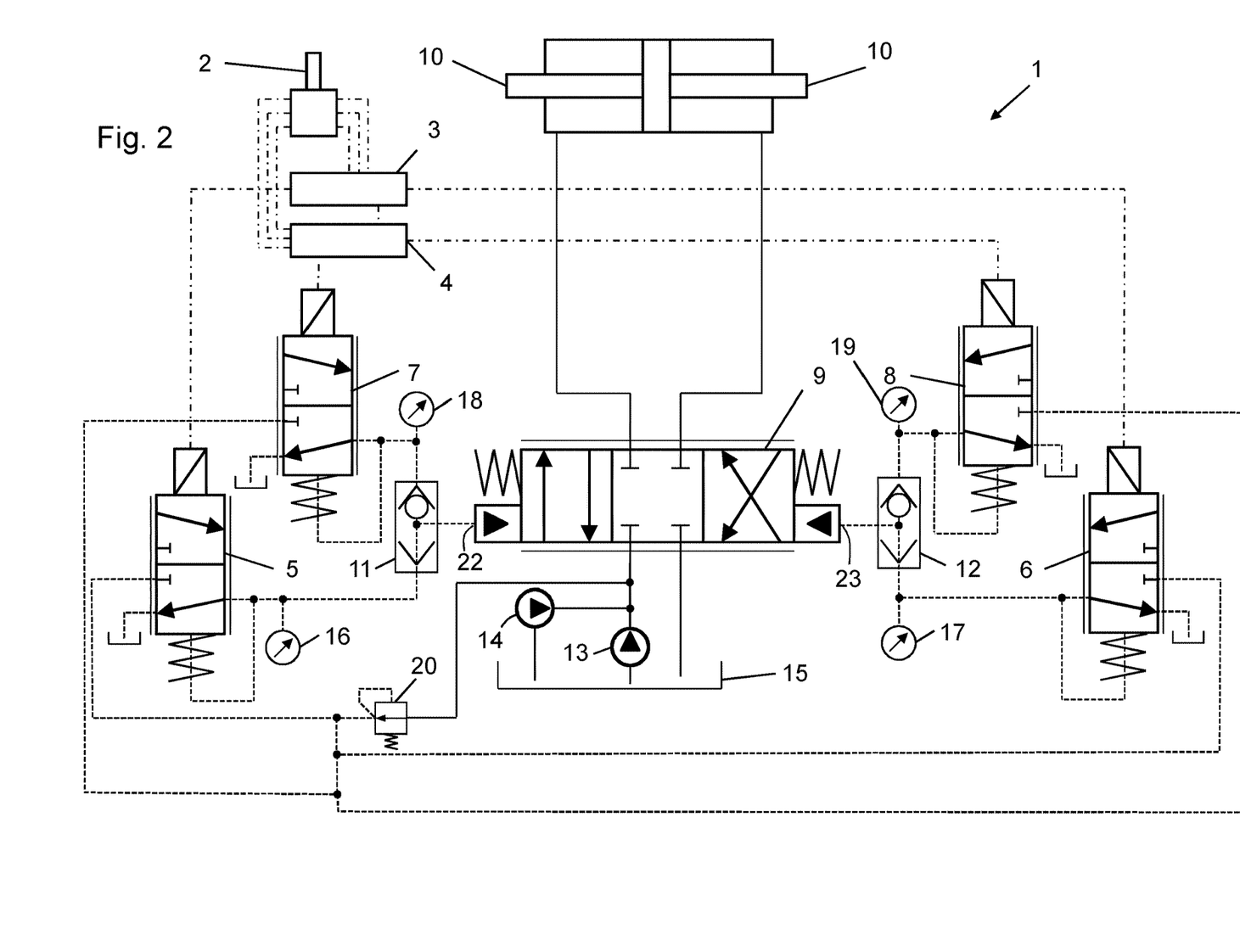

FIG. 2 schematically shows a layout of an electro-hydraulic control system 1 for directing fluid to an hydraulic actuator according to a second example of the disclosure. The features shared with the system 1 described in FIG. 1 have the same numbers.

System 1 of the second example comprises an input device 2 electrically connected to a first electronic controller 3 and a second electronic controller 4. A first pilot valve 5 and a second pilot valve 6 are electrically connected to the first electronic controller 3 relaying the steering direction inputs from the input device 2 to the first and second pilot valves 5, 6. A third pilot valve 7 and a fourth pilot valve 8 are electrically connected to the second controller 4 relaying the steering direction inputs from the input device 2 to the pilot valves 7, 8.

The use of a second electronic controller 4 provides redundancy to the system. In one example the first and second electronic controller are electrically connected to each other in order to provide additional redundancy.

In the example embodiment of FIG. 2, the input device 2 is a three signal input device in form of a joystick or lever for controlling the motion of the actuator 10. The three signal input device 2 provides further improved redundancy over a two signal input device.

Moreover, for further enhanced redundancy, a first pump 13 and a second pump 14 are arranged to provide fluid flow to the pilot operated main valve and to the pilot valves 5, 6, 7, 8. The first pump 13 and second pump 14 are connected to a tank 15. The first pump 13 is preferably the vehicle's main pump being able to supply all parts of the vehicle with hydraulic fluid flow. The second pump 14 may be a pump used for redundancy if the first pump 13 would fail. In the example of steering a vehicle, the second pump 14 can be a gear pump rotatably connected to one of the vehicle's wheel axes. Thus, if the first pump 13 fails when the vehicle is in motion, the secondary pump can more or less instantaneously provide at least the steering control system 1 with hydraulic fluid flow in order to safely steer the vehicle and let it come to a stop. Alternatively, the second pump 14 can be powered by an electrical machine or the like. Both the first and second pumps 13, 14 can be fixed displacement or variable displacement pumps.

The first and second pair of pilot valves 5, 6; 7, 8 of the system in FIG. 2 can be controlled by electric controllers 3, 4 to be activated either substantially in parallel or sequentially, as described above.

The hydraulic system of FIG. 2 may alternatively include a single hydraulic pump or a single electronic controller.

Figure 3:
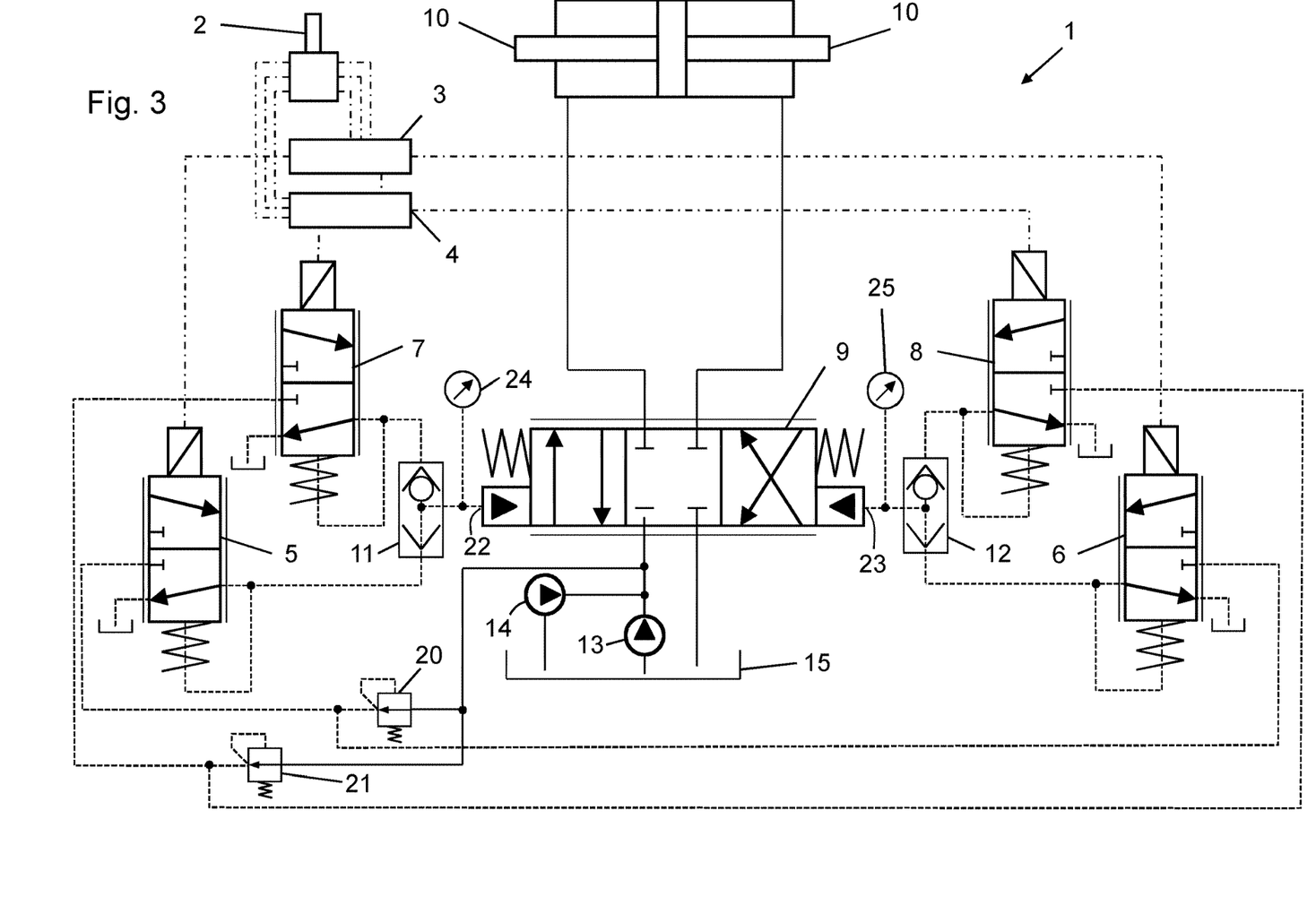

FIG. 3 schematically shows a layout of an electro-hydraulic control system 1 for directing fluid to a hydraulic actuator according to a third example of the disclosure. The features shared with the system 1 described in FIGS. 1 and 2 have the same numbers.

In FIG. 3, a first and a second pilot inlet port 22, 23 of the main valve is shown to be connected to the first and third pilot valves 5; 7 and second and fourth pilot valves 6; 8 respectively. First and second main valve pilot pressure sensors 24, 25 for monitoring the pilot pressure supplied to the first and second pilot inlet port 22, 23 respectively are located near the inlet ports 22, 23 after the shuttle valves 11, 12.

the first pressure regulator 20 regulates the pressure to the first and second pilot valves 5, 6 which in this example are the primary pilot valves. A second pressure regulator 21 regulates the pressure to the third and fourth pilot valves 7, 8 which in this example are the secondary pilot valves. A primary pilot valve pressure fed to the first and second pilot valves 5, 6 is higher than a secondary pilot valve pressure fed to the third and fourth pilot valves 7, 8 in the cases where pressure or position is measured on the main valve 9 only.

The electro-hydraulic control system is particularly suitable for being used in a steering system for mobile machinery and mobile working machines. For example, the electro-hydraulic control system may be used for steering of a wheel loader, mobile mining vehicles, dumper, and mobile forest vehicles. Reference signs mentioned in the claims should not be seen as limiting the extent of the matter protected by the claims, and their sole function is to make claims easier to understand.

As will be realised, the system and method of the present disclosure may be modified in various respects, all without departing from the scope of the appended claims. Accordingly, the drawings and the description thereto are to be regarded as illustrative in nature, and not restrictive.

REFERENCES

1. System
2. Input device
3. First electronic controller
4. Second electronic controller
5. First pilot valve
6. Second pilot valve 7. Third pilot valve
8. Fourth pilot valve
9. Pilot operated main valve
10. Actuators
11. First shuttle valve
12. Second shuttle valve
13. First pump
14. Second pump
15. Tank
16. First pressure sensor
17. Second pressure sensor
18. Third pressure sensor
19. Fourth pressure sensor
20. First pressure regulator
21. Second pressure regulator
22. First pilot inlet port
23. Second pilot inlet port
24. First main valve pilot pressure sensor
25. Second main valve pilot pressure sensor
29. Spring

The invention claimed is:

1. An electro-hydraulic control system for directing fluid to at least one hydraulic actuator, the electro-hydraulic control system comprising:
at least one electronic controller;
first and second pilot valves being electrically connected to the at least one electronic controller which is arranged to control the operation of the first and second pilot valves,
third and fourth pilot valves being electrically connected to the at least one electronic controller which is arranged to control operation of the third and fourth pilot valves,
a pilot operated main valve configured to control fluid flow to the at least one hydraulic actuator,
wherein the first and second pilot valves and the third and fourth pilot valves each being fluidly connected to the pilot operated main valve and configured to forward a direction input to the pilot operated main valve to control fluid flow to the at least one hydraulic actuator,
wherein the first pilot valve and the third pilot valve are connected in parallel via a first shuttle valve to a first pilot inlet port of the main valve,
wherein the second pilot valve and the fourth pilot valve are connected in parallel via a second shuttle valve to a second pilot inlet port of the main valve,
wherein each of the first and second pilot valves and the third and fourth pilot valves includes a spool, an inlet port fluidly connected to a high-pressure fluid source, a first regulated outlet port fluidly connected to the first pilot input port or the second pilot inlet port of the main valve, and a second outlet port fluidly connected to a low pressure reservoir,
wherein the spool is moved to a first position to enable fluid communication between the first regulated outlet port and the second outlet port when a corresponding one of the first and second pilot valves and the third and fourth pilot valves is in a deactivated state,
wherein the spool is moved to a second position to enable fluid communication between the inlet port and the first regulated outlet port when a corresponding one of the first and second pilot valves and the third and fourth pilot is in an activated state in which the direction input is provided to the pilot operated main valve,
wherein the first and second pilot valves and the third and fourth pilot valves are fail-safe pilot valves arranged to drain the first regulated outlet port to the low pressure reservoir if the spool of a corresponding one of the fail-safe pilot valves becomes stuck in an open state during which a solenoid actuator of the corresponding one of the of fail-safe pilot valves moves into a non-actuated position corresponding to the deactivated state of the corresponding one of the fail-safe pilot valves while the spool remains in the second position corresponding to the activated state of the corresponding one of the fail-safe pilot valves whereby the solenoid actuator is disconnected from the spool, and
wherein when the spool is stuck in the open state, the spool being in the second position enables fluid communication between the inlet port and the second outlet port via a fluid connection between an internal fluid line of the spool and a surrounding cavity in which pressurized fluid is accumulated, the internal fluid line being fluidly connected between the surrounding cavity and the low pressure reservoir whereby fluid flows from the high-pressure fluid source to the low pressure reservoir.

2. The electro-hydraulic control system according to claim 1, wherein the system further comprises a first pressure regulator connected to the first and second pilot valves and a second pressure regulator connected to the third and fourth pilot valves, wherein the pressure provided from the first pressure regulator is higher than the pressure provided from the second pressure regulator.

3. The electro-hydraulic control system according to claim 2, wherein the system is configured to monitor a spool position of the main valve.

4. The electro-hydraulic control system according to claim 3, wherein an input device for providing direction input is electrically connected to the at least one electronic controller.

5. The electro-hydraulic control system according to claim 2, wherein the system comprises a first and second main valve pilot pressure sensors for monitoring the pilot pressure supplied to the first and second pilot inlet ports respectively.

6. The electro-hydraulic control system according to claim 1, wherein the system is configured to monitor a spool position of each of the first, second, third and fourth pilot valves respectively.

7. The electro-hydraulic control system according to claim 6, wherein, when the system determines that the spool of any one of the first, second, third and fourth pilot valves is in a stuck position, direction inputs to the first, second, third or fourth pilot valve that has the spool in the stuck position, are shut off.

8. The electro-hydraulic control system according to claim 1, wherein the system comprises a first, second, third and fourth pressure sensor for monitoring the pilot valve pressure of each of the first, second, third and fourth pilot valves respectively.

9. The electro-hydraulic control system according to claim 8, wherein, when a pressure sensor indicates a pressure error of any one of the first, second, third and fourth pilot valves, direction inputs to the first, second, third or fourth pilot valve that has a stuck spool, is shut off.

10. The electro-hydraulic control system according to claim 1, wherein the at least one electronic controller may be arranged to operate only the first pilot valve and the second pilot valve while the third pilot valve and the fourth pilot valve are idle.

11. The electro-hydraulic control system according to claim 10, wherein the high-pressure fluid source comprises a first pump and a second pump arranged to provide fluid flow to the main valve and the first, second, third and fourth pilot valves.

12. The electro-hydraulic control system according to claim 11, wherein the second pump is arranged to be driven by an electrical motor.

13. The electro-hydraulic control system according to claim 1, wherein the at least one electronic controller is arranged to operate the first pilot valve and the third pilot valve substantially in parallel and the second pilot valve and the fourth pilot valve substantially in parallel.

14. The electro-hydraulic control system according to claim 1, wherein the high-pressure fluid source comprises a first pump arranged to provide fluid flow to the main valve and the first, second, third and fourth pilot valves.

15. The electro-hydraulic control system according to claim 1, wherein the at least one controller comprises a first electronic controller and a second electronic controller where the first and second electronic controllers are electrically connected to each other to provide redundancy.

16. The electro-hydraulic control system according to claim 15, wherein the first and second pilot valves are electrically connected to the first electronic controller, which is arranged to relay the direction inputs from an input device to the first and second pilot valves.

17. The electro-hydraulic control system according to claim 15, wherein the third and fourth pilot valves are electrically connected to the second electronic controller, which is arranged to relay the direction inputs from the input device to the third and fourth pilot valves.

18. The electro-hydraulic control system according to claim 15, wherein an input device for providing direction inputs is electrically connected to both the first electronic controller and the second electronic controller.

19. The electro-hydraulic control system according to claim 18, wherein the input device is a three signal input device.

20. A method for directing fluid to at least one hydraulic actuator in an electro-hydraulic control system, the method comprising:
providing at least one electronic controller;
providing first and second fail-safe pilot valves being electrically connected to the at least one electronic controller which is arranged to control the operation of the first and second pilot valves,
providing third and fourth fail-safe pilot valves being electrically connected to the at least one electronic controller which is arranged to control operation of the third and fourth pilot valves,
providing a pilot operated main valve configured to control fluid flow to the at least one hydraulic actuator,
fluidly connecting each of the first and second pilot valves and each of the third and fourth pilot valves to the pilot operated main valve and configuring each of said pilot valves to provide control action to the pilot operated main valve to control fluid flow to the at least one hydraulic actuator,
connecting the first pilot valve and the third pilot valve in parallel via a first shuttle valve to a first pilot inlet port of the main valve,
connecting the second pilot valve and the fourth pilot valve in parallel via a second shuttle valve to a second pilot inlet port of the main valve, wherein each of the first and second pilot valves and the third and fourth pilot valves includes a spool, an inlet port fluidly connected to a high-pressure fluid source, a first regulated outlet port fluidly connected to a first pilot input port or a second pilot inlet port of the main valve, and a second outlet port fluidly connected to a low pressure reservoir,
supplying fluid from the high-pressure fluid source to the inlet port of a corresponding one of the first and second pilot valves and the third and fourth pilot valves;
moving the spool of the corresponding one of the first and second pilot valves and the third and fourth pilot valves to a first position to enable fluid communication between the first regulated outlet port and the second outlet port of the corresponding one of the first and second pilot valves and the third and fourth pilot valves when the corresponding one of the first and second pilot valves and the third and fourth pilot valves is in a deactivated state,
moving the spool to a second position to enable fluid communication between the inlet port and the first regulated outlet port when the corresponding one of the first and second pilot valves and the third and fourth pilot valves is in an activated state in which the direction input is provided to the pilot operated main valve, and
if the spool of any of the fail-safe pilot valves becomes stuck in an open state during which a solenoid actuator of the corresponding one of the of fail-safe pilot valves moves into a non-actuated position corresponding to the deactivated state of the corresponding one of the fail-safe pilot valves while the spool remains in the second position corresponding to the activated state of the corresponding one of the fail-safe pilot valves whereby the solenoid actuator is disconnected from the spool, draining the first regulated outlet port of the corresponding one of the fail-safe pilot valves to the low pressure reservoir,
wherein when the spool is stuck in the open state, the spool being in the second position enables fluid communication between the inlet port and the second outlet port via a fluid connection between an internal fluid line of the spool and a surrounding cavity in which pressurized fluid is accumulated, the internal fluid line being fluidly connected between the surrounding cavity and the low pressure reservoir whereby fluid flows from the high-pressure fluid source to the low pressure reservoir.

* * * * *

UNITED STATES PATENT AND TRADEMARK OFFICE
CERTIFICATE OF CORRECTION

PATENT NO. : 11,125,254 B2
APPLICATION NO. : 16/333853
DATED : September 21, 2021
INVENTOR(S) : Björn Eriksson and Hans Bodén

It is certified that error appears in the above-identified patent and that said Letters Patent is hereby corrected as shown below:

On the Title Page

Item (12), delete "Erikksson" and insert -- Eriksson --.

Item (72), the inventor's name "Björn Erikksson" should read "Björn Eriksson".

Signed and Sealed this
Sixth Day of June, 2023

Katherine Kelly Vidal
*Director of the United States Patent and Trademark Office*